(12) United States Patent
Smith et al.

(10) Patent No.: US 6,647,391 B1
(45) Date of Patent: Nov. 11, 2003

(54) SYSTEM, METHOD AND ARTICLE OF MANUFACTURE FOR FAST MAPPING FROM A PROPERTIED DOCUMENT MANAGEMENT SYSTEM TO A RELATIONAL DATABASE

(76) Inventors: Ian E. Smith, 283 Bella Vista Way, San Francisco, CA (US) 94127; Paul M. Aoki, 969 G Edgewater Blvd., #772, Foster City, CA (US) 94404; W. Keith Edwards, 1527 Guerrero St., San Francisco, CA (US) 94110; John O. Lamping, 1299 Eva Ave., Los Altos, CA (US) 94024; Thomas K. Rodriguez, 960 Potrero Ave., San Francisco, CA (US) 94110; James D. Thornton, 3312 Bay Rd., Redwood City, CA (US) 94063

( * ) Notice: Subject to any disclaimer, the term of this patent is extended or adjusted under 35 U.S.C. 154(b) by 489 days.

(21) Appl. No.: 09/613,928

(22) Filed: Jul. 11, 2000

(51) Int. Cl.[7] ............................................. G06F 17/30
(52) U.S. Cl. .......................... 707/100; 707/101; 707/1
(58) Field of Search .............................. 707/100, 101, 707/102, 1, 2, 103, 104

(56) References Cited

U.S. PATENT DOCUMENTS

| | | | | | |
|---|---|---|---|---|---|
| 5,873,093 | A | * | 2/1999 | Williamson et al. | 707/101 |
| 6,052,693 | A | * | 4/2000 | Smith et al. | 707/102 |
| 6,122,641 | A | * | 9/2000 | Williamson et al. | 707/101 |
| 6,175,837 | B1 | * | 1/2001 | Sharma et al. | 707/102 |
| 6,366,922 | B1 | * | 4/2002 | Althoff | 707/2 |
| 6,405,209 | B2 | * | 6/2002 | Obendorf | 707/1 |

* cited by examiner

Primary Examiner—Sanjiv Shah

(57) ABSTRACT

A system, method and article of manufacture are provided for fast mapping from a document management system to a relational database. A database is provided having a plurality of tables relating to a plurality property groups. Each property group in the database has a set of properties associated therewith. In the database, property groups having at least one common property with one another are grouped into a common table while property groups having no common properties are grouped into separate tables in the database. When a document having one or more properties is provided, a determination is made as to which of the property groups in the database apply to the document. The properties of the document are then mapped to those tables in the database which include a property group that has been determined to apply to the document.

29 Claims, 7 Drawing Sheets

SYSTEM, METHOD AND ARTICLE OF MANUFACTURE FOR FAST MAPPING FROM A PROPERTIED DOCUMENT MANAGEMENT SYSTEM TO A RELATIONAL DATABASE

FIELD OF THE INVENTION

The present invention relates generally to information management and, more particularly, efficiently storing and updating property data in a relational database.

BACKGROUND OF THE INVENTION

Speaking broadly, a property-based storage system is one that allows arbitrary properties to be attached to a document. Properties are named attribute/value pairs. Documents may be any kind of electronic entity, such as files, application objects, etc. Perhaps the most straightforward way to implement a property-based storage system is to store all properties for all documents as separate entities. For example, each property might be stored in its own row in a relational database table. (This approach has sometimes been termed "unstructured storage," or a "vertical schema," in the art.) One advantage of this approach is simplicity. However, this approach may suffer from serious performance penalties in some common workloads.

Another approach is to store added properties separately from an initial set of properties. An external binding interface (such as the Typelib interface in OLE Automation™ from Microsoft Corp.) can be used to associate arbitrary attributes with individual object instances. In this approach, the initial set of properties can be stored in some optimized way, however, accesses to added properties suffer from performance penalties since their storage is not optimized. A complete discussion of using properties for uniform interaction in a document system can be found in, Paul Dourish, W. Keith Edwards, Anthony LaMarca and Michael Salisbury, "Using Properties for Uniform Interaction in the Presto Document System," *Proceedings of the 12$^{th}$ ACM Symposium on User Interface Software and Technology*, ACM Press, New York, November 1999, pp. 55–64.

Object Persistence Systems

An object persistence system is a means by which a software developer can cause objects created by an application to remain accessible after the application terminates. One can distinguish between object persistence systems and systems that simply provide object-oriented interfaces to records in existing databases. Examples of the latter include DBTools.h++™ from Rogue Wave Software. Object persistence can be implemented in at least two different ways. First, persistence can be achieved by storing the application objects in an object-oriented database. One advantage of using an object-oriented database maybe that the amount of translation work is small so that the application objects are usually stored in some fairly straightforward manner, e.g., by serialization or virtual memory mapping.

Second, persistence may also be achieved by using object mapping, a layer of software that maps the developer's objects into records in an underlying, non-object-oriented database. While the amount of translation work is typically higher than that imposed by an object-oriented database, the object mapping approach can take advantage of the scalability and/or feature-richness of the (typically more mature) non-object-oriented database systems.

Object persistence implies that the developer (at least potentially) has control over the object/database mapping, i.e., how the data is broken down into records within the underlying database. This mapping is a fundamental intellectual problem underlying object mapping systems.

Because of the prevalence of object-oriented programming, many object mapping systems have been developed. These systems allow the user to specify an object model, from which a database schema (typically relational) is generated. The user is usually given the opportunity to change this schema to reflect their needs (e.g., using denormalization to improve query performance). Examples of commercial object mapping systems include: Java Blend™ from Sun Microsystems, JDX™ from Software Tree, and Extreme Object Persistence Service™ from Secant Technologies. However, such systems fix the mapping when the database is built; unlike the present invention, additional properties cannot be (easily) added later.

Repository Systems

A repository system stores application metadata as persistent objects. For example, the repository might expose the schema of a bank's transaction-processing database in a manner that is understood by the bank's software development tools, thereby eliminating some manual work on the part of the bank's application programmers. Repository systems typically implement versioning because they support processes such as software engineering and database schema design that undergo many stages of evolution. Since they must support many different classes as well as versions of these classes, they must address the problem of storing large databases consisting of many, relatively small collections of objects in which the objects in each collection have properties different from those in other collections. This problem resembles (in scale) the problem of managing objects with arbitrary properties. Therefore, systems such as Microsoft Repository™ from Microsoft Corp. provide mechanisms by which the user can optimize the storage of sets of properties in tables. However, unlike the present invention, Microsoft Repository stores all of a single class's properties in a single table (and then combines multiple classes into the same table if the user believes they will be used together).

The ability to set arbitrary properties on documents has been supported in document management systems. The storage of properties as individual rows in a relational database system has also been done before. Also, the storage of partially structured data in tables whose rows contain columns corresponding to property values, and partly in tables whose rows contain individual property values is known. There is a need for a flexible and dynamic system for mapping from a document management system to a relational database.

SUMMARY OF THE INVENTION

A system, method and article of manufacture are provided for fast mapping from a document management system to a relational database. A database is provided having a plurality of tables relating to a plurality of property groups. Each property group in the database has one or more properties associated therewith. In applying a property group to a document, the application or programmer applying the group is entering into a contract with the document management system that all of these properties will exist on the document and that the types of the values will be at least (in the object-oriented sense of a type relationship) the types mentioned. In the database, each property group is mapped to one or more tables which store the values of properties in that group. When a document having one or more properties is provided, the properties of the document are then mapped to those tables in the database that include one or more property groups that has been determined to apply to the document.

In an aspect of the present invention, each property group may have a set of columns in a table in which the respective properties are stored. Possible states of where a property group is mapped to one or more tables include: the property group residing by itself in a single table with one or more columns for each property, the property groups being split across multiple tables with one or more columns in each table, or a property group residing in a single table shared by one or more other property groups.

In an embodiment of the present invention, when the document management system receives an additional property group (having a set of properties associated therewith) to be added to the database, a determination may be made as to whether the additional property group has any properties in common with the preexisting property groups of the database. If it is determined that the additional property group has no properties in common with the preexisting property groups of the database, then a new table maybe created in the database relating to the additional property group.

If, on the other hand, it is determined that the additional property group has at least one property in common with at least one of the preexisting property groups of the database, then one or more of the preexisting tables in the database may be modified to accommodate the additional property group. In one aspect of the present invention, the modification can involve adding columns for the additional property group to each preexisting table that is related to a property group in the database having at least one common property with the new property group. If the additional property group has been mapped to more than one table in the database because of sharing common properties with two or more preexisting property groups, then all of the modified tables for the additional property group may then be merged into a single table in the database.

In one embodiment of the present invention, partial loading can be performed upon receiving a query for retrieving a document having one or more particular properties associated therewith. A determination may then be made as to which of the property groups includes the one or more queried properties in their set of properties. All of the properties of the document that are part of the property groups determined to include the one or more queried properties in their set of properties may then be retrieved from the database. If the one or more properties of the query are determined not to belong to any of the property groups of the database, then all of the properties of the document that are not mapped to any property group of the database may be retrieved from the database.

BRIEF DESCRIPTION OF THE DRAWINGS

The foregoing and other objects, aspects and advantages are better understood from the following detailed description of a preferred embodiment of the invention with reference to the drawings, in which.

DETAILED DESCRIPTION OF THE INVENTION

Figure 1:
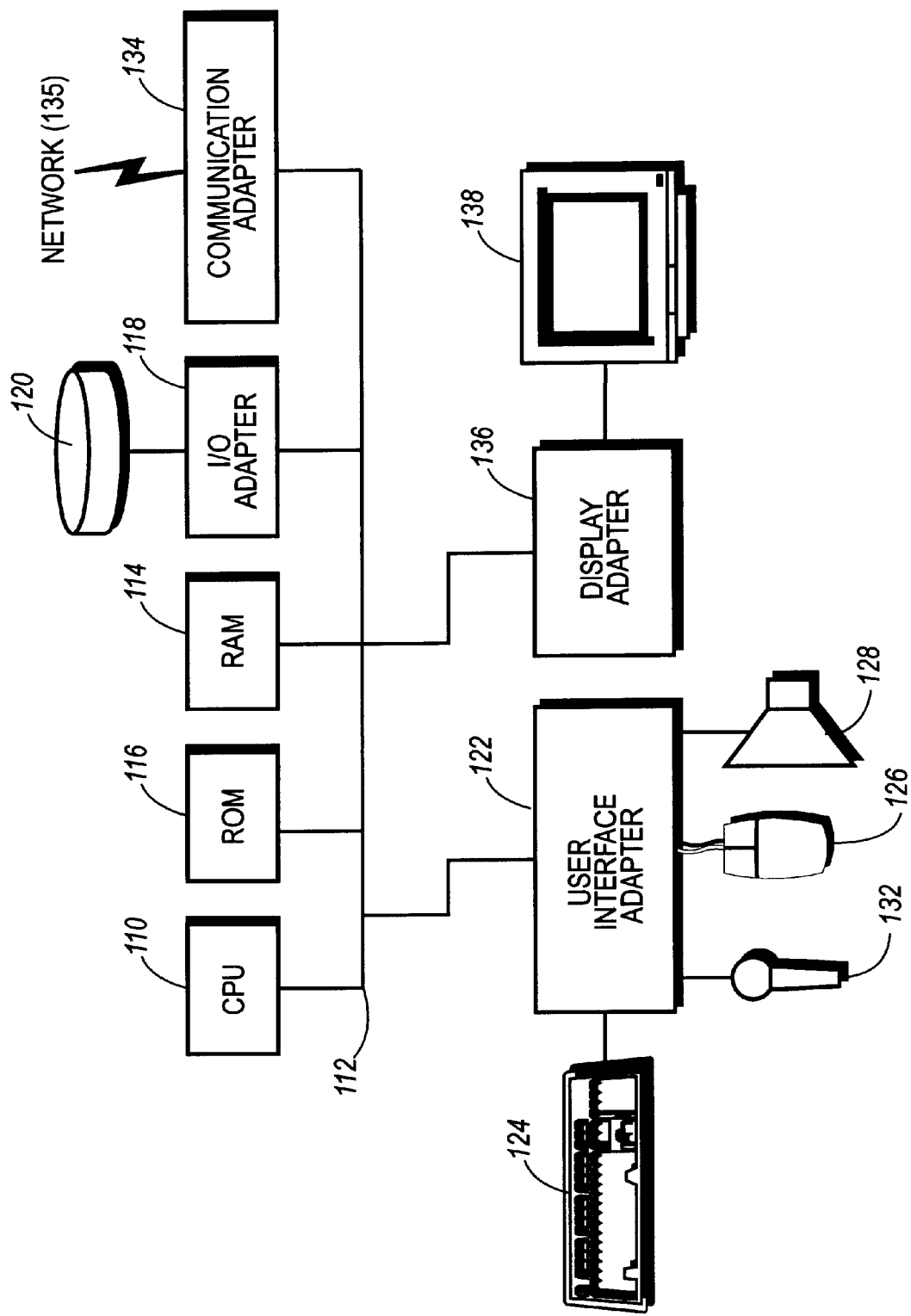
FIG. 1 illustrates a representative hardware environment in accordance with one embodiment of the present invention.

The embodiments of the present invention focus on an approach for a fast implementation of a property-based document management system on top of a relational database management system (RDBMS). In a property-based document management system, each document has a set of associated named properties (attribute/value pairs) that describe the document. One may think of a document's property set as being similar to the instance variables of an object or the attributes of a database record. In general, the approach taken by the present invention groups sets of related properties together into relational tables. This allows the document management system to achieve the retrieval and update performance of the underlying RDBMS in many cases. However, the groupings are more dynamic and flexible than those permitted by conventional database management systems. This simplifies the task of writing application programs that rely upon the document management system.

Embodiments of the present invention are suitable for managing large collections of persistent electronic documents. One problem that may be found in large-scale document management is the ability to find documents based on queries over their associated properties. Another problem may be the difficulty in providing end-users the ability to customize the property sets of individual documents or sub-collections of documents. This ability can be very useful if the customization can occur at any time (i.e., after the document has been created and has had an initial set of properties associated therewith). In the past, the implementation of document property sets has either provided good query and update performance with essentially no customization ability, or good customization ability with relatively poor query and update performance. In contrast, embodiments of the present invention provide a process for persistently storing document property sets that provides substantial benefits in flexibility while still providing good performance.

One idea behind the invention is the ability to associate property groups with individual documents. A document may have any number of property groups. Property groups may overlap (i.e., more than one property group may contain the same property). Property groups maybe associated with a document at any time; they need not be exhaustively declared when, e.g., the document is created.

Property groups provide the programmer with a means of declaring sets of semantic relationships between properties. A preferred embodiment allows the use of property groups as hints to the underlying storage system to cluster properties together physically. An embodiment of this clustering takes the form of mapping each property to a distinct column in a table of a relational database. Physical clustering facilitates more efficient retrieval and update of sets of properties when it is known that they will be typically retrieved or updated at the same time. Most of the latency of fetching a small amount of data (e.g., a few property values) from the database is due to the round-trip through the network client/server interface. Applications tend to access and/or update more than one property in a group within a short period of time, but tend not to access multiple groups as frequently. Therefore, segmenting a document's properties into semantically related groups tends to reduce the number of network round-trips while reducing the raw amount of data transmitted unnecessarily.

The use of property groups can simplify the programming of applications. The declaration of explicit semantic relationships between the properties of a given property group assists programmers in their reading and understanding of the application program. Furthermore, the ability to associate several properties with a given document (as opposed to defining each property individually) means that a modular approach can be taken during programming.

The mapping of property groups into the underlying storage system is a flexible and dynamic approach to physical clustering. The organization of the columns of a table in a relational database system is typically managed by a database administrator who has been granted special privileges. Such management includes the definition and modification of classes in an object-oriented database management system. When the physical organization of a table or class changes, then some explicit step must be executed by the privileged administrator. This is because such structural changes may have negative effects on the performance and/or the correctness of applications which are using the database. In accordance with a preferred embodiment, the programmer only sees documents, properties and property groups. The precise physical mapping of properties into the underlying storage system is hidden from the programmer (although the programmer does know that mapping hints have been provided to the storage system in the form of property group declarations). Therefore, the property-based document management system is free to change the mapping at any time.

Since the physical organization of the property groups is hidden from the programmer, multiple mappings can be used to store a given property group. For example, if the underlying storage system is in the process of reorganizing a property group form mapping A to a new mapping B, the document management system can query the data stored using both mappings and combine them to produce the desired answer. This enhances the availability of the overall document management system. In prior art systems, physical reorganization of a relational table or object collection implies a privileged data definition command that has a negative impact on concurrent access to the data being reorganized.

To summarize, the definition of property group in the present invention may result in several advantages. First, the clustering may help to reduce the overhead of performing retrieval and update operations on properties. As a second advantage, the property group may provide a way in which application programmers can express that a semantic relationship exists between the properties within the group. The grouping gives programmers the ability to add properties in a modular fashion. A third advantage is that property groups may be fully dynamic and can be added or deleted at any time. The latter advantage is enhanced by the ability to have multiple mappings simultaneously active for a given property group.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112.

The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned. A preferred embodiment is written using JAVA, C, and the C++ language and utilizes object oriented programming methodology. A relational database system such as Oracle Server Enterprise Edition™ from Oracle Software is utilized in a preferred embodiment, but one of ordinary skill in the art will readily comprehend that other database systems can be substituted without departing from the claimed invention. For example, an object-oriented oriented database system such as ObjectStore™ from Object Design, Inc. can be used.

Figure 2:
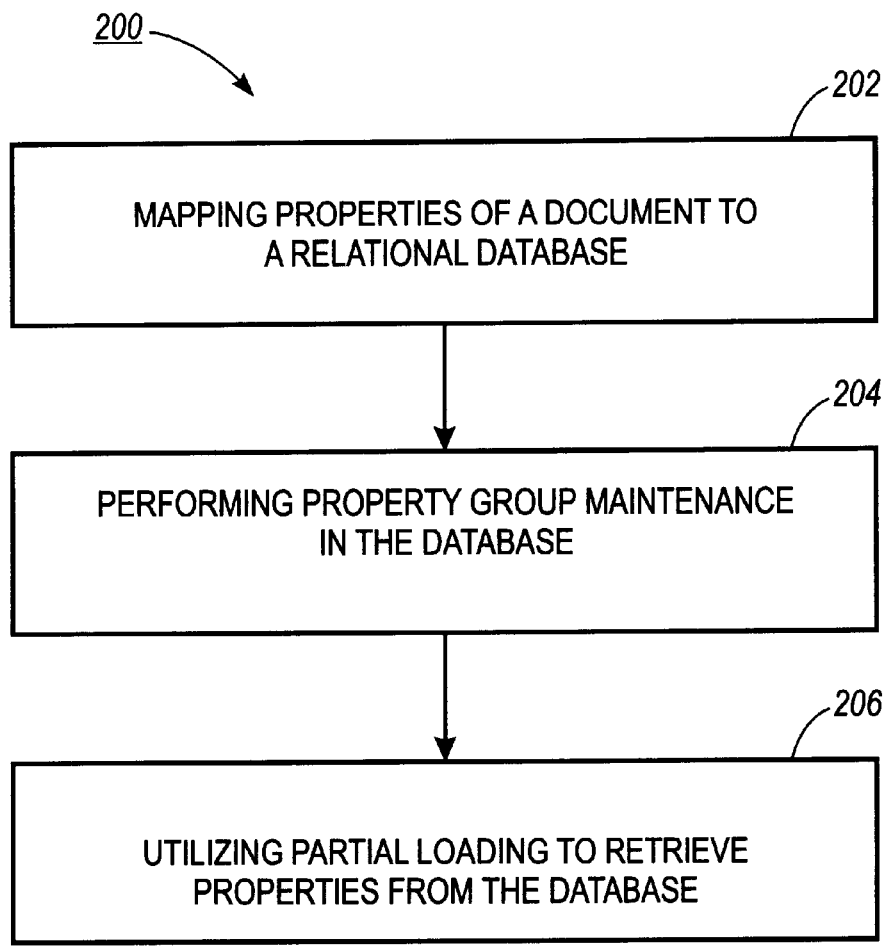
FIG. 2 is a flowchart of an overall process for fast mapping from a document management system to a relational database in accordance with an embodiment of the present invention.

FIG. 2 is a flowchart of an overall process 200 for fast mapping from a document management system to a relational database. Properties of a document are mapped to a relational database in operation 202. Maintenance of the property groups in the database is performed in operation 204. Partial loading is utilized to retrieve properties of documents stored in the database in operation 206.

In general, applications written against a propertied document-management system may be divided into two broad classes: weak and strong. A weak application may be considered as those applications that utilize the "free flowing" nature of the storage system to read or write properties on documents that are not (or cannot be) anticipated in advance. Such applications exploit the fundamental nature of the storage system like dynamically-typed programming languages such as Smalltalk, a property-based storage system has the ability to decide at run-time the attributes of an object or document. An example of this class of application is Dourish's Vista document browser. In this example, documents can be organized by the addition of properties of the users choosing, and thus properties read and written by the application cannot be determined in advance.

A strong application, speaking broadly, is the type of application that uses the property system as a more "structured" store of information. Members of this class of applications are classified as strong because they exploit those properties of the document management system that are most similar to a strongly-typed programming language. Strong applications know what information (stored in properties) they will need and how it has to be structured for their correct operation. Frequently, strong applications are exclusively interested in documents with properties (or, more commonly, collections of properties) that they created or have been explicitly informed about. Examples of the strong class of applications could be an electronic mail (email) server program and an email-reading client program.

The documents of interest are known to be email messages, and thus specific properties are "expected" for correct functioning, such as "from," , "date," and "message-id." Further, these exemplary applications share an understanding of what an email message is by agreeing on the names and types of the properties involved in email sending and receiving.

Arising from weak and strong classes are types of hybrid classes. First, there are strong applications that become weak once a particular set of data is located. For example, an email application may allow the user to add arbitrary properties to email messages. This is the first type of hybrid application—it finds the documents of interest in a strong way, but then allows some types of weak operations on them. The second type of hybrid is a hybrid document. Such a document participates in the functioning of at least one strong and one weak application. For example, opening an email message document in a weak application allows the document to be modified in a weakly-structured way, while the document remains suitable for use with a strong email application that is ignorant of the weak application.

What follows from these classes and hybrids is a set of algorithms to map weak, strong, and hybrid applications on to a relational database while giving excellent performance. In particular, applications which are either strong or a strong-weak hybrid should get performance characteristics that are quite similar to applications written to use a relational model, a very "strong" type of data storage. This performance may be achieved without sacrificing the flexibility of the propertied-storage programming model.

Property groups are a set of property names and property value types grouped together for a program's use. In one aspect, they may be encoded in a Java class (i.e., directly in the software) although the idea works with other encodings. For example, a common property group is the set of properties that structure information for browsing. This group might be written something like this:

Browser.name: java.lang.String

Browser.size: java.lang.Integer

Browser.creation: java.util.Date

It should be clear from this property group, called "Browser," that many applications and their associated documents may wish to participate in this structure. Indeed any document that is created by an application probably will have this structure applied to it. A document may have any number (including zero) of such property groups applied to it simultaneously and the set of property groups may be changed at any time. If several property groups are applied to a document simultaneously, then any property names that they share must have compatible types. (This sharing of property names can be seen as a rough form of inheritance in the property space.) If incompatible property groups are applied, the first attempt to enforce a property group that is incompatible with existing groups will be rejected.

In applying a property group to a document, the application or programmer applying the group is entering into a contract with the document management system that all of these properties will exist on the document and that the types of the values will be at least (in the object-oriented sense of a type relationship) the types mentioned. In the case above, a browsing application and a mail program can coordinate through the Browser property group to format the information presented to the user properly, and to be sure that the information will be accessible to the other program.

In one embodiment of the present invention, applications that use property names that appear in any property group may be required to obey the rules of the property group, even though the application may be unaware of or not using that group. In such an embodiment, the namespace of properties may need to be carefully protected to avoid unexpected failures of applications that "stumble onto" a part of the property namespace that has a property group structure imposed on it. However, this is not the only possible route to take on this issue—it is possible to allow weak applications to use any property names and enforce the property group rules only when the property group is applied. Pragmatically, the latter approach may simply delay the problem of collisions in the property namespace until the property group is applied.

Mapping to a Relational Database

The fact that property groups can overlap means that the mapping from property groups to the underlying storage system must handle this situation. Many of the possible specific mappings from declared groups of attributes to relational tables are part of the prior art in object-relational mapping systems. For example, there are many variations on the basic technique of storing the instances of each class in an object system as a separate table in a relational database. However, since known persistent object systems do not allow classes to share instance variables, there are additional complications that are addressed in accordance with a preferred embodiment that cannot be handled by any prior art techniques.

Figure 3:
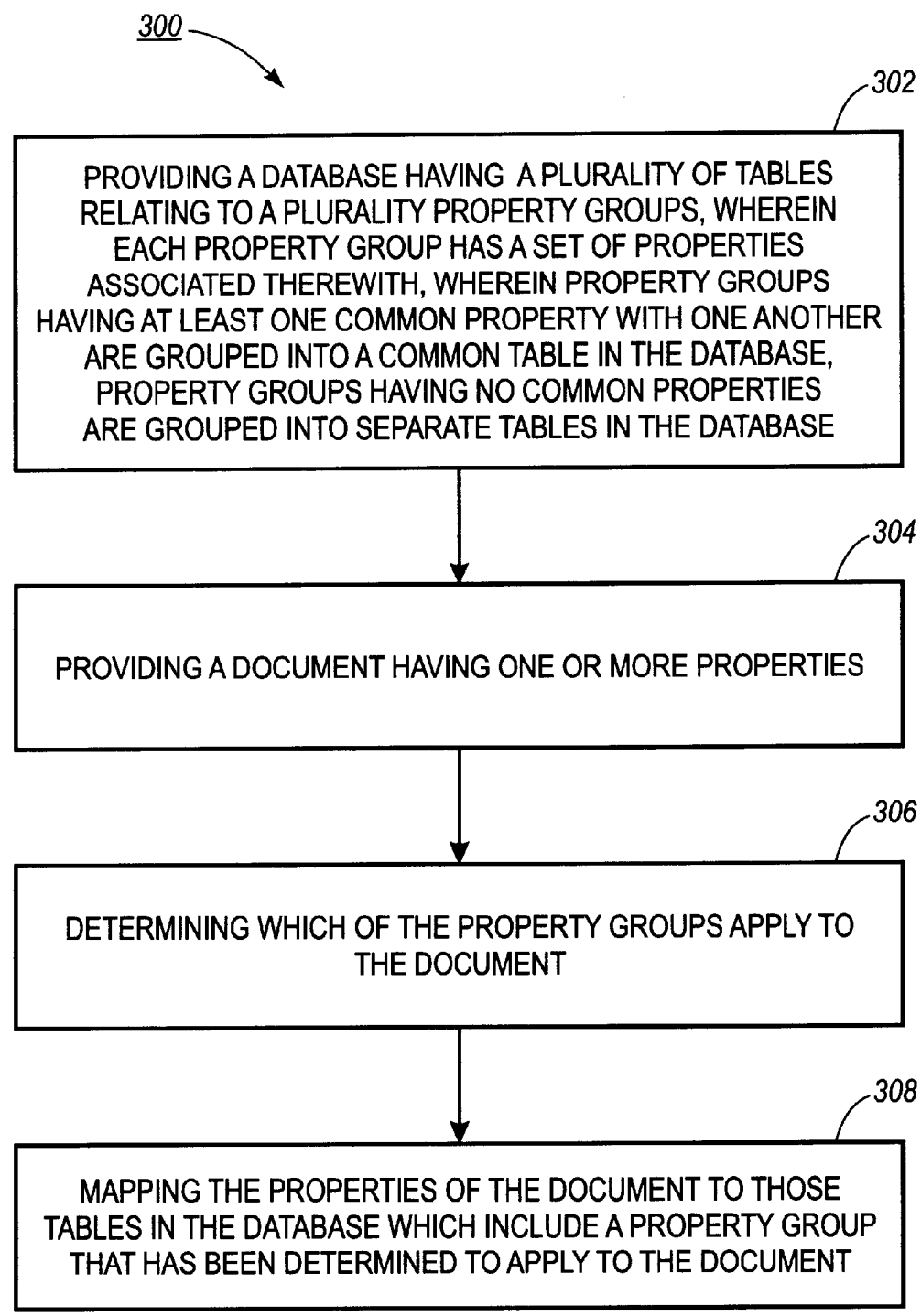
FIG. 3 is a flowchart of a process for mapping properties of a document to a relational database in accordance with an embodiment of the present invention.

FIG. 3 is a flowchart of a process for mapping properties of a document to a relational database in operation 202. In operation 302, a database is provided having a plurality of tables relating to a plurality property groups. Each property group in the database has a set of properties associated therewith. In the database, property groups having at least one common property with one another are grouped into a common table while property groups having no common properties are grouped into separate tables in the database. When a document having one or more properties is provided in operation 304, a determination is made as to which of the property groups in the database apply to the document in operation 306. The properties of the document are then mapped in operation 308 to those tables in the database which include a property group that has been determined to apply to the document.

The following assumes that the reader has a basic understanding of relational database concepts such as tables, rows, and columns. Under a basic approach, each property group is structured as a set of columns in a table, with each document that has the property group applied to it having one row in that table. Property groups that are disjoint in the property namespace are kept in separate tables and property groups that share property names are kept in the same table.

Figure 4:
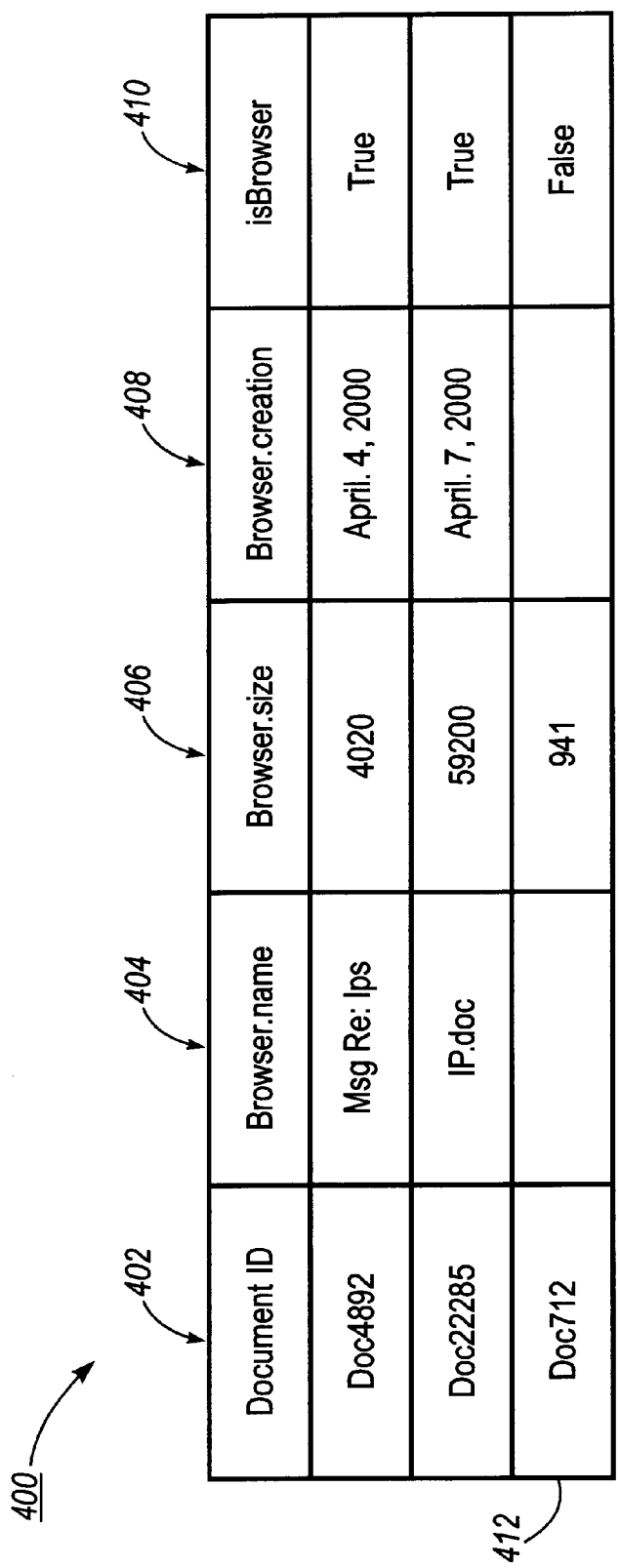
FIG. 4 is an illustration of an exemplary table in accordance with an embodiment of the present invention.

FIG. 4 is an illustration of an exemplary table 400 in accordance with an embodiment of the present invention. The table includes a plurality of columns including a Document ID column 402, a Browser.name column 404, a Browser.size column 406, a Browser.creation column 408, and an isBrowser column 410. The isBrowser column 410 in the table 400 is used to distinguish documents that have had the property group applied to them from those that have not. Since the semantics allow a document to have each of the properties in a weak way in addition to having the property group's strong structure, one may have to do extra bookkeeping to know if this property group is being enforced. The last row 412 of the table 400 shows that an application has placed the property "Browser.size" on document 712 but has not chosen to use the property group "Browser."

Figure 5:
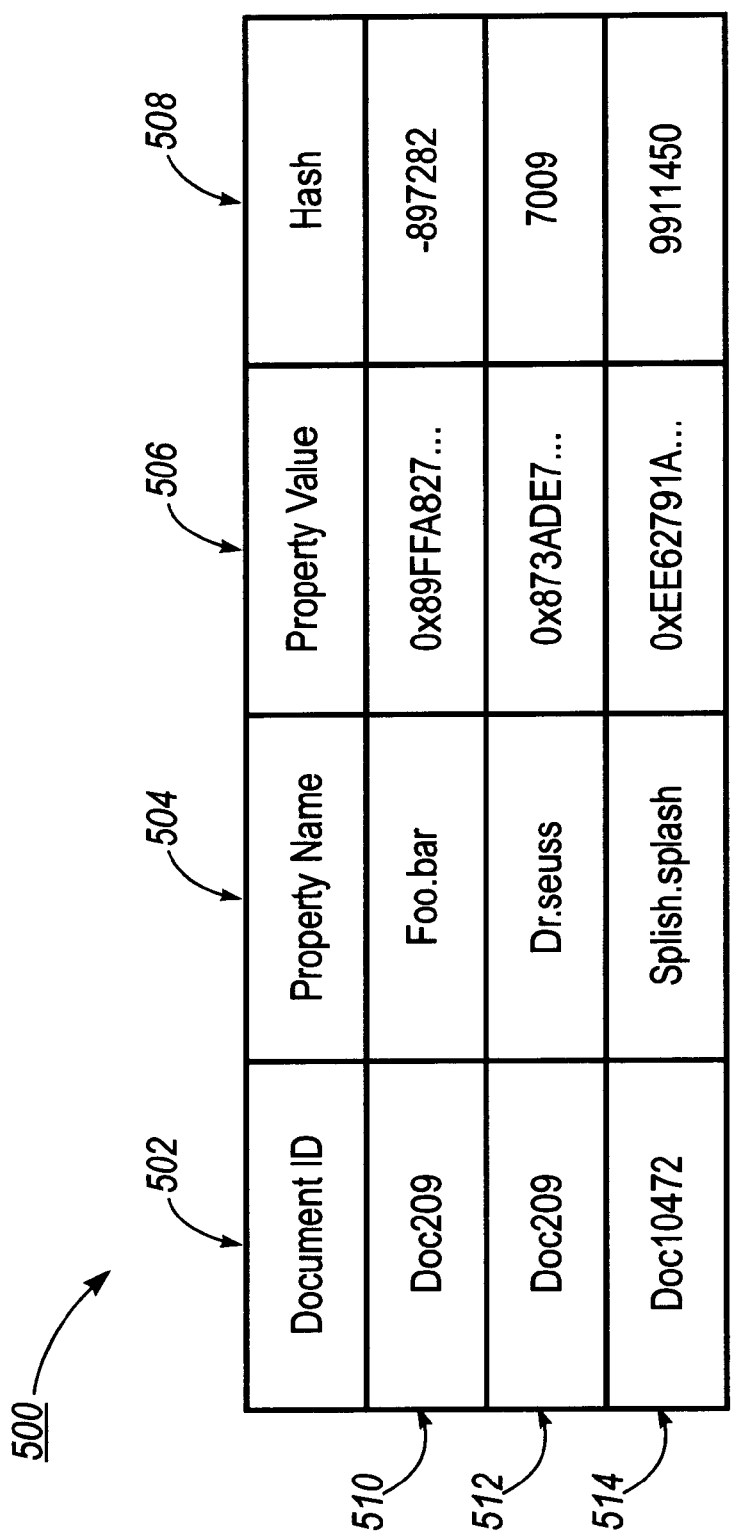
FIG. 5 is an illustration of an exemplary unstructured table in accordance with an embodiment of the present invention.

FIG. 5 is an illustration of an exemplary unstructured table 500 in accordance with an embodiment of the present invention. Because some, perhaps even many, properties will not be participants in any property group, a table may be stored that has these "unstructured" properties. Such a table may be referred to as an unstructured table. In an unstructured table, each row is roughly a property name-value pair. In the exemplary unstructured table 500 illustrated in FIG. 5 includes four columns: a Document ID 502 column, a Property Name column 504, a Property Value Column 506, and a Hash column 508. In this table 500, two unstructured properties 510, 512 are on document 209, and one 514 is on document 10472. The values of unstructured properties maybe stored as serialized Java objects in SQL binary large objects (Blobs) in the column Property Value. The Hash column 508 of this table 500 maybe used to make equality queries fast. In one aspect of the present invention, the Hash value may be determined by calling the "hashcode()" method on the Java object that is the value of the property. Since the database cannot interpret the serialized object in the value column when evaluating a query, one can use the hash value column (that is understood by the database) to give a conservative estimate of equality. This may require that some false positive matches be removed after the database does an evaluation involving data in this table.

Property Group Maintenance

Under the present system, the storage management layer may have to do significant processing whenever a previously unknown property group is used. In general, this process can be broken into two primary steps. First, determine if the new property group overlaps (i.e., shares properties with) any existing property group. Second, create a new table for this property group or alter another table if this property group overlaps another.

Figure 6:
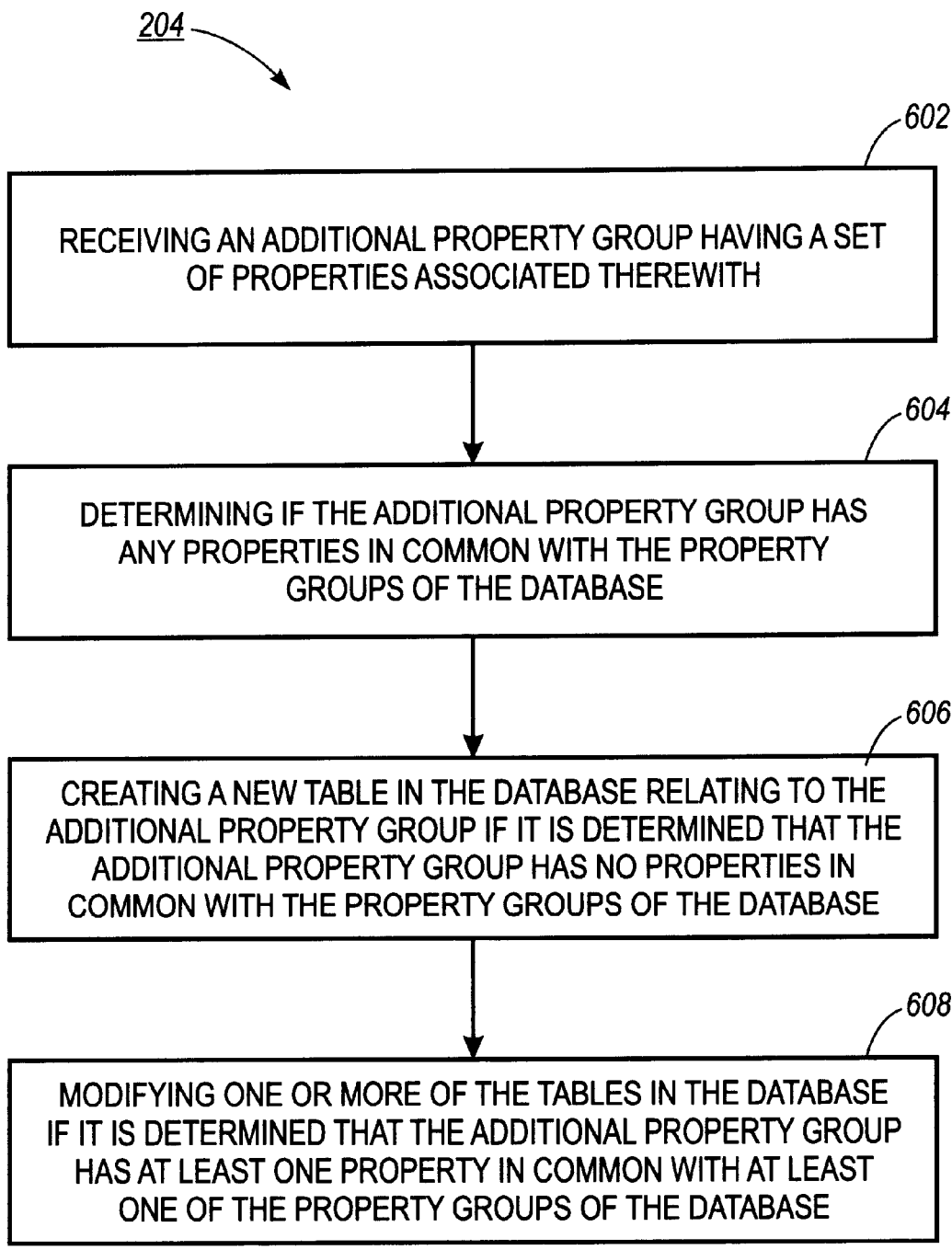
FIG. 6 is a flowchart of a process for performing property group maintenance in accordance with an embodiment of the present invention.

FIG. 6 is a flowchart of a process 204 for performing property group maintenance in accordance with an embodiment of the present invention. After the database management system receives an additional property group (having a set of properties associated therewith) to be added to the database in operation 602, a determination may be made in operation 604 as to whether the additional property group has any properties in common with the preexisting property groups of the database, If it is determined that the additional property group has no properties in common with the preexisting property groups of the database, then a new table may be created in the database relating to the additional property group in operation 606. If, on the other hand, it is determined that the additional property group has at least one property in common with at least one of the preexisting property groups of the database, then, in operation 608, one or more of the preexisting tables in the database may be modified to accommodate the additional property group.

In one aspect of the present invention, the modification can involve relating the additional property group to each preexisting table that is related to a preexisting property group in the database having at least one common property with the property group. If the additional property group has been related to more than one table in the database because of sharing common properties with two or more preexisting property groups related to two or more unrelated tables, then all of the modified tables that have been related to the additional property group may then be merged into a single table in the database.

The previous section (Mapping to a Relational Database) describes the simple case of a single property group mapping to a single table. In many situations, several property groups may map to the same relational table. This mapping is desirable because it allows each property (a column in the table) to appear exactly once in all the tables it is involved in. This "each property appears once" strategy minimizes consistency problems that can occur if each property group had its own copy of a particular property that was intended to be shared.

When addressing the issue of determining the overlap between property groups, the storage layer may keep track (in a table in the relational database) of all properties and what property group or groups they appear in. When a new property group is encountered, there are three cases. The first, and most simple, case is when there are no overlapping properties. In this case, a new table is created for the property group. In a second case, the property group overlaps only one other property group, in which the existing table is modified with columns to accommodate the new property group.

In the third case, the new property group overlaps more than one other property group. In this case, each table representing an existing property group that overlaps the new group is merged with another, until only one table is left. The merged table's columns is the union of all the existing tables that were overlapped, plus the columns that were added to accommodate the new property group. The data in the existing tables is copied over into this new, larger table in such a way that every document occupies exactly one row. This process may end up unioning rows that were previously in disjoint tables. This new, merged table can represent several property groups; however, each represented property group will have a column like "isBrowser" in the example above, so it is possible to determine which of the several property groups apply to a given document (even though they are contained in a single relational table).

It should be noted that, as an option, this strategy for property group maintenance does not have to reverse (undo) the process above when all documents have been removed from a given property group. It should be understood that property group maintenance operations can be initiated and controlled in any of a variety of ways. Such differences in initiation and control do not fundamentally alter the basic methods used to perform property group maintenance and their respective advantages/disadvantages.

Property group maintenance can be initiated manually (i.e., though an explicit action taken by a human operator) or automatically (i.e., by the system recognizing that some event has occurred). If maintenance is initiated automatically, a number of different types of events, or combinations of event types, can be used. The addition, deletion, or modification of property groups might signal the beginning of a maintenance operation. This is the method used in the discussion above. Similarly, the addition, deletion, or modification of some amount of data might cause the document management system to decide that a maintenance operation should occur (perhaps based on thresholds that are determined using a cost-based optimization model).

Property group maintenance can be initiated in either a synchronous or an asynchronous manner. Maintenance operations can be performed synchronously (i.e., immediately) after a manual command has been issued or a triggering event has occurred. Alternatively, commands or triggering events might serve only to schedule the asynchronous (i.e., eventual) execution of maintenance operations.

For example, maintenance operations might be deferred until the system is idle (eg., when the load is low).

Property group maintenance can be controlled in an atomic manner or an incremental manner. Atomic control implies that a given logical reorganization operation (e.g., the merging of two tables) is performed at one time—perhaps, but not necessarily, as a single physical reorganization step, or as a series of physical reorganization steps which are contained within a single database transaction. Incremental control implies that a given logical operation is not necessarily performed atomically. For example, the merging of two tables might be performed in a series of steps; while this merging proceeded, the document management system would have to issue queries and update commands in a way that recognized that the reorganization is only partially complete.

Partial Loading

In one embodiment of the present invention, making the performance of applications faster may be accomplished by exploiting the particular features of the relational model that make database management systems fast (for example, exploiting the fast behavior of an RDBMS to perform reads of all the rows of a given table or selected rows from a given table).

Figure 7:
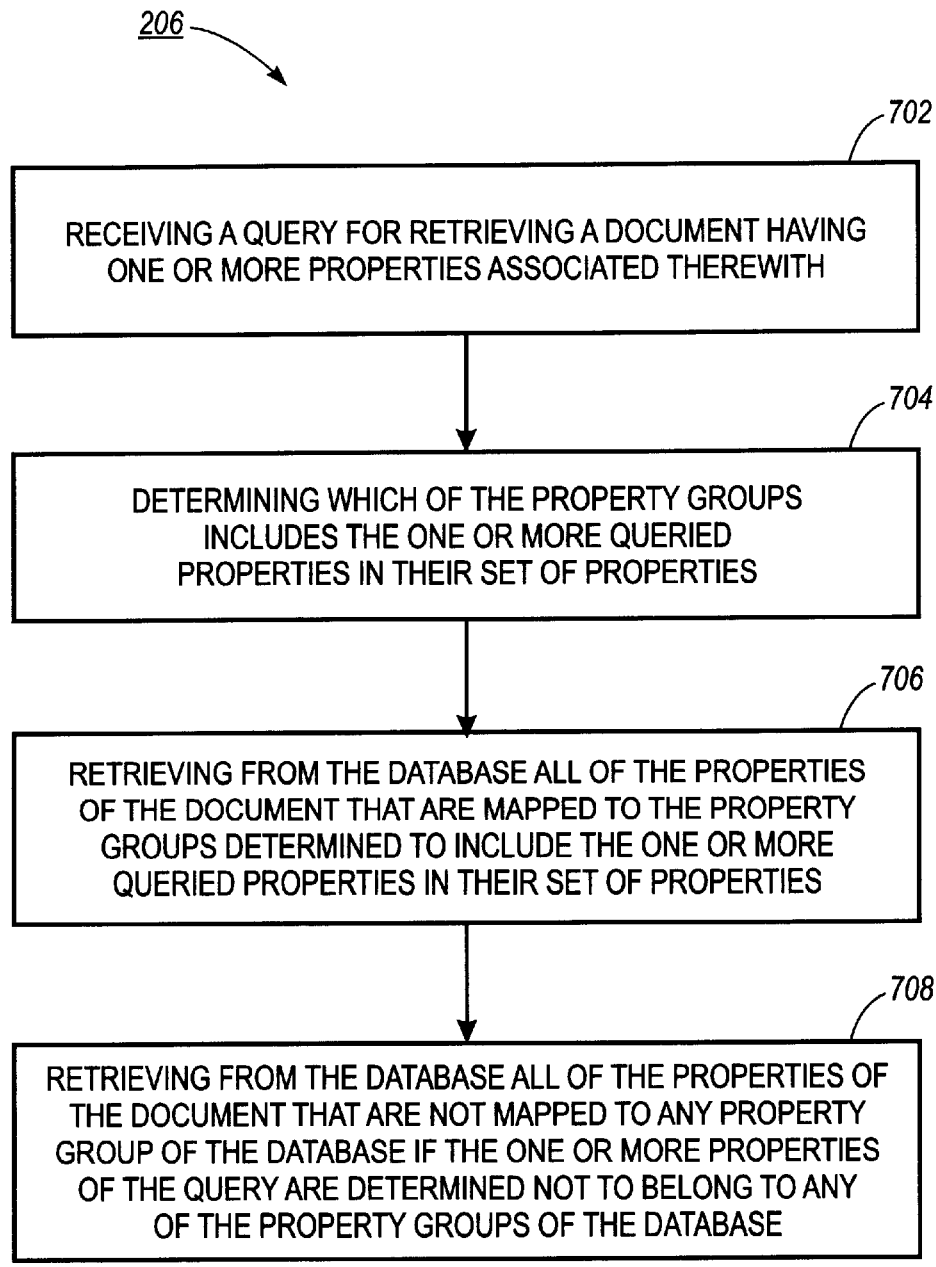
FIG. 7 is a flowchart of a process for utilizing partial loading to retrieve properties from the database in accordance with an embodiment of the present invention.

However, in another embodiment of the present invention, partial loading may be utilized to retrieve properties more quickly. FIG. 7 is a flowchart of a process 206 for utilizing partial loading to retrieve properties from the database in accordance with an embodiment of the present invention. Partial loading can be performed upon receiving a query for retrieving a document having one or more particular properties associated therewith in operation 702. A determination may then be made as to which of the property groups includes the one or more queried properties in their set of properties in operation 704. In operation 706, all of the properties of the document that are mapped to the property groups determined to include the one or more queried properties in their set of properties may then be retrieved from the database. If the one or more properties of the query are determined not to belong to any of the property groups of the database, then all of the properties of the document that are not mapped to any property group of the database may be retrieved from the database in operation 708.

In general, a standard relational model separates different data sets into tables. Thus, reading a particular table gives no information about other tables. (It is possible to infer information via relational joins.) In contrast, partial loading under the present document management system treats the "atom" of the storage system to be a document rather than a row. When a document is "read in" or "found," the assumption of the programming model is that all parts of that document are accessible, or known. For example, the programming model allows the programmer to ask, "What are all the properties of this document?" Clearly, if all the information is spread out between different tables, it may be difficult (and most likely slower) to look at all the tables to find all the properties of a given document.

To alleviate this problem, a lazy strategy for loading is utilized. The present invention allows one to ask for the set of "all documents whose properties satisfy this query predicate and have this property group associated with them." In this, very common, case, only the part of the relevant documents that can be found in the table that represents the property group is loaded. In the case that other properties are accessed on this document at a later time, extra bookkeeping (optionally stored in a table in the relational database) may be used to discover all the property groups that the given document participates in. Should the property accessed be part of a property group, that property group's entire set of properties is loaded. This maybe done to avoid needless database round-trips and to exploit the locality that is likely to be encouraged by property groups.

If a property is accessed that is not part of any property group (an "unstructured" or "weak" property) then all the weak properties for this document may be loaded from the database. Since there may be little locality to these accesses, this approach helps to avoiding about one-half the communication costs by loading all the weak properties when any weak property is accessed (e.g., the one-half savings is versus loading the properties individually with a database round-trip for each).

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for mapping properties of a document to a relational database, comprising the steps of:

(a) providing a database having a plurality of tables relating to a plurality of property groups, wherein each property group has a set of properties associated therewith;

(b) providing one or more documents having zero or more properties;

(c) determining which of the property groups apply to the one or more documents;

(d) mapping the properties of the one or more documents to those tables in the database which include a property group that has been determined to apply to the one or more documents; and (e) dynamically altering the mapping of the properties to the tables in the database.

2. A method as recited in claim 1, wherein two or more property groups may contain common properties.

3. A method as recited in claim 1, further comprising the step of receiving an additional property group having a set of properties associated therewith; determining if the additional property group has any properties in common with the property groups of the database, and creating a new table in the database relating to the additional property group if it is determined that the additional property group has no properties in common with the property groups of the database.

4. A method as recited in claim 1, further comprising steps of: receiving an additional property group having a set of properties associated therewith; determining if the additional property group has any properties in common with the property groups of the database, and modifying one or more of the tables in the database if it is determined that the additional property group has at least one property in common with at least one of the property groups of the database.

5. A method as recited in claim 4, wherein modifying one or more of the tables in the database further comprises: relating the additional property group to each table that is related to a property group in the database having at least one common property with the property group, and merging all of the tables that have been related to the additional property group into a single table in the database.

6. A method as recited in claim 1, further comprising: receiving a query for retrieving a document having one or more properties associated therewith, determining which of the property groups includes the one or more queried properties in their set of properties, and retrieving from the database all of the properties of the document that are mapped to the property groups determined to include the one or more queried properties in their set of properties.

7. A method as recited in claim 6, further comprising retrieving from the database all of the properties of the document that are not mapped to any property group of the database if the one or more properties of the query are determined not to belong to any of the property groups of the database.

8. A method as recited in claim 1, wherein each property group has a set of columns in the table in which the respective property group is grouped.

9. A method as recited in claim 1, wherein multiple mappings are created for a particular property group.

10. A computer program as recited in claim 9, wherein the database remains accessible while updates occur.

11. A computer program as recited in claim 10, further comprising a code segment that incrementally alters the mapping of the properties.

12. A method as recited in claim 1, wherein property groups having at least one common property with one another are grouped into a common table in the database, property groups having no common properties are grouped into separate tables in the database.

13. A method as recited in claim 1, wherein dynamically altering the mapping of the properties comprises at least one of: combining, splitting, adding, deleting of tables or adding or removing columns of a table.

14. A method as recited in claim 13, wherein existing data in tables is rearranged to correspond to the altered mapping.

15. A computer program embodied on a computer readable medium for mapping properties of a document to a relational database, comprising:

(a) a code segment that provides a database having a plurality of tables relating to a plurality property groups, wherein each property group has a set of properties associated therewith;

(b) a code segment that creates one or more documents having zero or more properties;

(c) a code segment that determines which of the property groups apply to the one or more documents;

(d) a code segment that maps the properties of the one or more documents to those tables in the database which include a property group that has been determined to apply to the one or more documents; and (e) a code segment that dynamically alters the mapping of the properties to the tables of the database.

16. A computer program as recited in claim 15, wherein a property group may comprise common properties.

17. A computer program as recited in claim 15, further comprising: a code segment that receives an additional property group having a set of properties associated therewith; a code segment that determines if the additional property group has any properties in common with the property groups of the database, and a code segment that creates a new table in the database relating to the additional property group if it is determined that the additional property group has no properties in common with the property groups of the database.

18. A computer program as recited in claim 15, further comprising: a code segment that receives an additional property group having a set of properties associated therewith; a code segment that determines if the additional property group has any properties in common with the property groups of the database, and a code segment that modifies one or more of the tables in the database if it is determined that the additional property group has at least one property in common with at least one of the property groups of the database.

19. A computer program as recited in claim 18, wherein the code segment that modifies one or more of the tables in the database further comprises: a code segment that relates the additional property group to each table that is related to a property group in the database having at least one common property with the property group, and a code segment that merges all of the tables that have been related to the additional property group into a single table in the database.

20. A computer program as recited in claim 15, further comprising: a code segment that receives a query for retrieving a document having one or more properties associated therewith, a code segment that determines which of the property groups includes the one or more queried properties in their set of properties, and a code segment that retrieves from the database all of the properties of the document that are mapped to the property groups determined to include the one or more queried properties in their set of properties.

21. A computer program as recited in claim 20, further comprising a code segment that retrieves from the database all of the properties of the document that are not mapped to any property group of the database if the one or more properties of the query are determined not to belong to any of the property groups of the database.

22. A computer program as recited in claim 20, wherein the code segment that determines which of the property groups apply to the document includes a code segment that compares the properties of the document with the set of properties of each property group.

23. A computer program as recited in claim 20, wherein a property group applies to the document if one of the properties of the document is included in the set of properties of the respective property group.

24. A computer program as recited in claim 15, wherein each property group has a set of columns in the table in which the respective property group is grouped.

25. A computer program as recited in claim 15, wherein multiple mappings are created for a particular property group.

26. A computer program as recited in claim 15, wherein property groups having at least one common property with one another are grouped into a common table in the database, property groups having no common properties are grouped into separate tables in the database.

27. A computer program as recited in claim 15, wherein dynamically altering the mapping of the properties comprises at least one of: combining, splitting, adding, deleting of tables or adding or removing columns of a table.

28. A system for mapping properties of a document to a relational database, comprising:

(a) logic that provides a database having a plurality of tables relating to a plurality property groups, wherein each property group has a set of properties associated therewith, wherein property groups having at least one common property with one another are grouped into a common table in the database, property groups having no common properties are grouped into separate tables in the database;

(b) logic that a document having zero or more properties;

(c) logic that determines which of the property groups apply to the document;

(d) logic that maps the properties of the document to those tables in the database which include a property group that has been determined to apply to the document; and (e) logic that dynamically alters the mapping of the properties.

29. A system as recited in claim 28, further comprising: logic that receives an additional property group having a set of properties associated therewith; logic that determines if the additional property group has any properties in common with the property groups of the database, and logic that creates a new table in the database relating to the additional property group if it is determined that the additional property group has no properties in common with the property groups of the database.

* * * * *